(No Model.)
F. A. GLASGOW.
PORTABLE GALVANIC BATTERY CELL.
No. 541,350. Patented June 18, 1895.
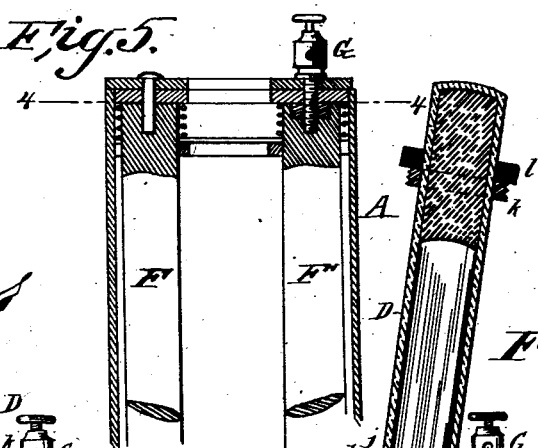
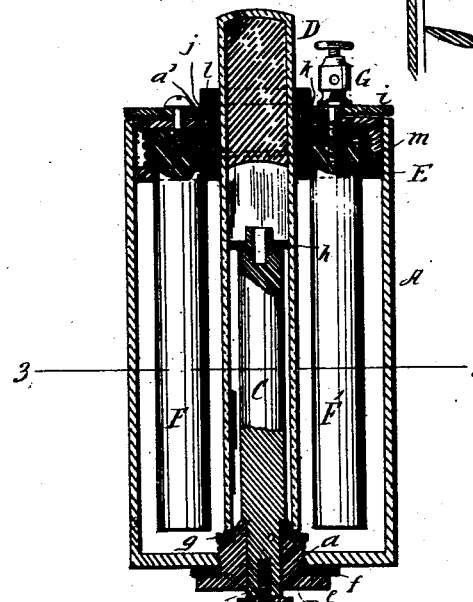
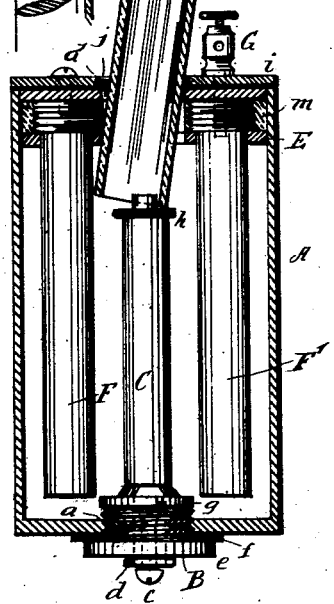
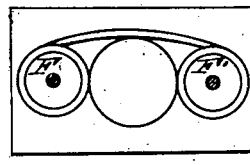
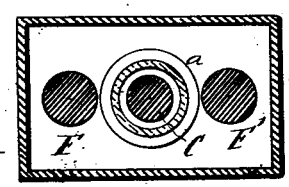
WITNESSES:
F. M. Astle.
G. M. Hopkins.
INVENTOR
F. A. Glasgow
BY
Munn & Co.
ATTORNEYS.

UNITED STATES PATENT OFFICE.

FRANK ADAMS GLASGOW, OF ST. LOUIS, MISSOURI.

PORTABLE GALVANIC-BATTERY CELL.

SPECIFICATION forming part of Letters Patent No. 541,350, dated June 18, 1895.

Application filed September 18, 1894. Serial No. 523,404. (No model.)

*To all whom it may concern:*

Be it known that I, FRANK ADAMS GLASGOW, of St. Louis, Missouri, have invented a new and Improved Portable Galvanic-Battery Cell, of which the following is a full, clear, and exact description.

Reference is to be had to the accompanying drawings, forming a part of this specification, in which similar letters of reference indicate corresponding parts in all the figures.

Figure 1 is a vertical section of a battery-cell constructed according to my improvement. Fig. 2 is a similar view showing the protecting-tube withdrawn from the zinc or positive element. Fig. 3 is a horizontal section taken on the line 3 3 in Fig. 1. Fig. 4 is an enlarged sectional plan view taken on line 4 4 in Fig. 5, and Fig. 5 is a section partly in elevation.

The object of my invention is to construct a simple, compact portable battery cell, of small dimensions, which may be applied to any of the uses for which small batteries are used, and which may in many cases be substituted for a large non-portable battery.

My invention consists—

First, in the combination with the zinc or positive element of an inclosing tube or casing (such tube or casing being closed at the upper end) which tube or casing may be placed over the zinc or positive element, thereby displacing the fluid from about this element and protecting it from being destroyed when the cell is not in use. The air or gas in the tube or casing displaces the fluid when the tube or casing is pushed down over the zinc or positive element.

Second, in the protrusion upward of the zinc or positive element from the bottom of the cell, the exposed portion of the positive element standing free from support.

It also consists in details of construction hereinafter more fully described.

The cell A is made of hard rubber, glass or other suitable material and is of rectangular, round or other section, with apertures $a$ $a'$ in the ends thereof. Through the aperture $a$ is inserted the zinc or positive element. This may be held in position either by cement or by a screw plug B preferably of hard rubber or glass. The plug B is centrally perforated to receive the shank $b$ formed on the end of the zinc rod or positive element C. The screw $c$ entering the end of the zinc or positive element C and the washer $d$ placed on the screw serve to clamp a conductor to the zinc or positive element.

The screw plug B is provided at its outer end with a flange $e$ between which and the bottom of the cell A is placed an elastic washer $f$. The inner end of the plug is reduced in diameter to receive the elastic washer $g$. To the upper end of the zinc or positive element is fixed a spring $h$ preferably of hard rubber which impinges on the inner surface of the tube or casing and serves the purpose of holding this tube or casing at any desired height. To the upper end of the cell is fitted a plate of hard rubber or glass which is provided with a screw threaded aperture $a'$ in the top of the cell A.

A tube D made of glass, hard rubber or other suitable material, and stopped at the upper end is adapted for insertion in the apertures $a'$ $j$ of the cell top, and plate $i$, and is provided with a screw-threaded collar $k$ which fits the threaded opening $j$ in the plate $i$ and holds the tube D in its place in the cell with its mouth in firm contact with the elastic washer $g$. An elastic collar $l$ placed on the tube D above the collar $k$ closes the top of the cell hermetically.

In the top of the cell A is fitted a horizontal partition E which is perforated to receive the tube D and the carbon rods F F'. The upper ends of the said carbon rods are connected electrically by a copper wire wrapped several times around them and extending across the space between the rods.

The rod F is fastened to the top of the cell by a screw passing through the top and into the rod, and in the rod F' is inserted a metallic nut into which the binding post G is screwed. The space between the horizontal partition and the top of the cell is filled with a body $m$ of wax, paraffine or a cement substance, which surrounds and protects the wire connections of the carbon rods. The top of the cell may be made solid, with the exception of the perforations for the tube D and the binding post and screw which pass through the top into the carbons, the two or more carbons being connected outside of the cell. There may be only one carbon used.

Any suitable battery fluid is placed in the cell A and wires are connected with a screw $c$ and binding post G. A good exciting fluid for this purpose is the well known bichromate of potash solution or the electropoion fluid.

When the battery is not in use, the zinc or positive element is protected by the tube D as shown in Fig. 1. To set the cell in action the tube is partly withdrawn from the positive element and is held up by the spring or rubber $h$ or it may rest on the rubber as shown in Fig. 2.

Having thus described my invention, I claim as new and desire to secure by Letters Patent—

1. In a galvanic cell, provided with a carbon or negative element, and a closed casing having a threaded aperture at the top, the combination with the zinc or positive element, of an impervious tube closed at its upper end and provided with a screw threaded collar surrounding the tube and fitted to the threaded aperture of the casing, substantially as specified.

2. In a galvanic battery, the combination of the battery cell provided with a removable zinc-holding screw plug, the zinc or positive element inserted in the screw plug, and a removable tube adapted to inclose the zinc, substantially as specified.

3. In a galvanic battery cell, the combination with the zinc or positive element, of a support at the bottom of the cell for the element, said support being provided with an elastic washer $g$, and an impervious tube or casing adapted to cover the zinc or positive element, and form a tight joint with the elastic washer, substantially as specified.

4. In a galvanic battery cell, the combination of the cell A, plug B, inserted in the bottom of the cell, the zinc or positive element C inserted in the plug, the impervious tube D, carbon rods F F', wire connecting the same and a body $m$ of protective material such as wax or cement surrounding the ends of the carbon rods, and inclosing the connections, substantially as specified.

5. In a galvanic battery cell, the combination of a zinc rod, an elastic support fixed to the end of the zinc rod, and a tube closed at one end and fitting the elastic support on the zinc rod so as to hold the said tube at any desired elevation, substantially as specified.

FRANK ADAMS GLASGOW.

Witnesses:
A. G. DOUGLASS,
W. C. VOORHEES.